United States Patent [19]

Tomiyama et al.

[11] Patent Number: 4,552,334
[45] Date of Patent: Nov. 12, 1985

[54] FLOW CHANGE-OVER VALVE FOR THE BLOWING OF FLUIDS INTO MOLTEN METAL VESSEL

[75] Inventors: Yoshiro Tomiyama; Masaaki Yamanashi; Hitoshi Morishita; Fumio Sudo; Shuzo Fujii; Hideo Miwa, all of Chiba, Japan

[73] Assignees: Kawasaki Steel Corporation, Kobe; Denka Consultant & Engineering Company Limited, Tokyo, both of Japan

[21] Appl. No.: 605,137

[22] Filed: Apr. 30, 1984

[30] Foreign Application Priority Data

Mar. 28, 1984 [JP] Japan ................. 59-58162

[51] Int. Cl.[4] .............. F16K 31/12; F16K 19/00
[52] U.S. Cl. ................ 251/240; 137/625.11; 137/625.41; 137/625.47
[58] Field of Search .............. 251/304, 240; 137/625.41, 625.46, 625.47, 897, 896, 625.11, 625.12, 625.15, 625.16, 246.13, 204

[56] References Cited

U.S. PATENT DOCUMENTS

| 646,104 | 3/1900 | Faber | 137/240 |
|---|---|---|---|
| 667,301 | 2/1901 | Dredge | 137/240 X |
| 1,493,133 | 5/1924 | Sykora | 137/625.47 |
| 1,725,337 | 8/1929 | Burkhard | 137/240 |
| 2,318,638 | 5/1943 | Scott | 137/240 |
| 2,661,926 | 12/1953 | Resek | 137/625.47 |
| 2,917,069 | 12/1959 | Lundy et al. | 137/240 |
| 3,026,894 | 3/1962 | Brooks | 137/240 |
| 3,045,692 | 6/1962 | Reynolds et al. | 137/240 |
| 3,282,287 | 11/1966 | Fowler | 137/246.13 |
| 3,556,360 | 1/1971 | Stelson | 137/240 |
| 3,782,632 | 1/1974 | Braun et al. | 222/144.5 |
| 3,957,082 | 5/1976 | Fuson et al. | 137/625.41 |
| 3,985,150 | 10/1976 | Kindersley | 137/240 |
| 4,059,250 | 11/1977 | Guldener et al. | 251/304 |
| 4,372,337 | 2/1983 | Holzenburger | 137/240 |
| 4,372,338 | 2/1983 | Efferson | 137/240 |
| 4,436,106 | 3/1984 | Tuchenhagen et al. | 137/614.11 |

FOREIGN PATENT DOCUMENTS

| 921239 | 11/1954 | Fed. Rep. of Germany | 137/625.46 |
|---|---|---|---|
| 1169233 | 4/1964 | Fed. Rep. of Germany | 137/625.41 |
| 864470 | 4/1961 | United Kingdom | 137/625.11 |
| 2072307 | 9/1981 | United Kingdom | 137/240 |
| 228445 | 5/1969 | U.S.S.R. | 137/240 |

Primary Examiner—Samuel Scott
Assistant Examiner—Carl D. Price
Attorney, Agent, or Firm—Balogh, Osann, Kramer, Dvorak, Genova & Traub

[57] ABSTRACT

Disclosed herein is a flow change-over valve for the blowing of fluids into a molten metal vessel, which includes a housing provided with at least three inlet ports for different fluids and an outlet port, a valve body with a main passage communicating selectively between one of the inlet ports and the outlet port and rotatably supported in the housing to perform the changing-over of inlet passages. Among these inlet ports, an inlet port for purging fluid is opened in the housing, and a shroud-like gap surrounding the valve body is formed between the inner periphery of the housing and the outer periphery of the valve body in such a manner that it communicates with the inlet port for the purging fluid disposed in the housing and is always to be communicated with an opening of an inlet port of the main passage during the changing-over through the rotation of the valve body.

2 Claims, 27 Drawing Figures

FIG_3

FIG_5a
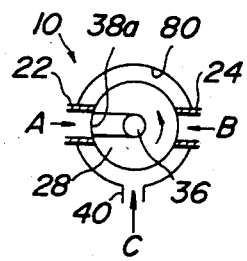
FIG_5b
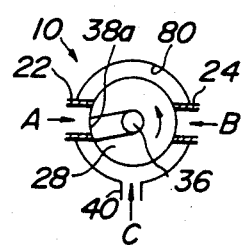
FIG_5c
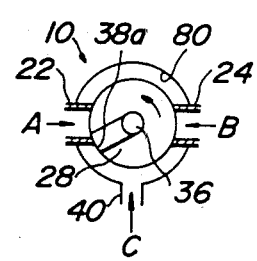
FIG_5d
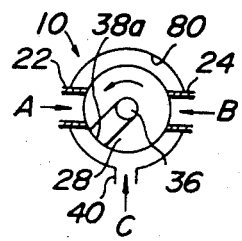
FIG_5e
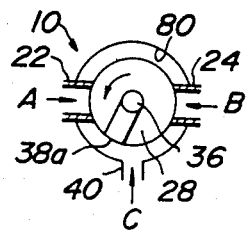
FIG_5f
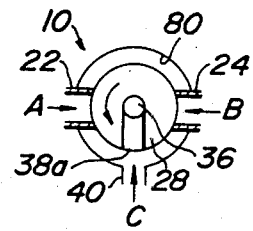
FIG_5g
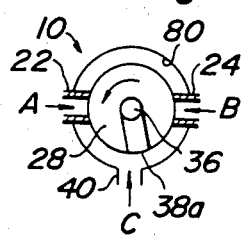
FIG_5h
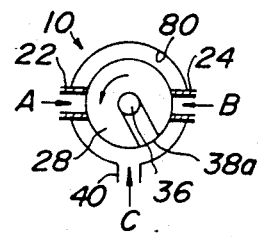
FIG_5i
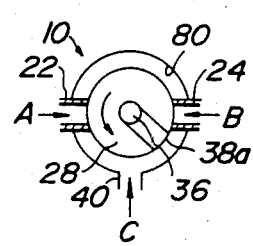
FIG_5j
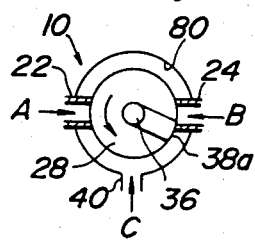
FIG_5k
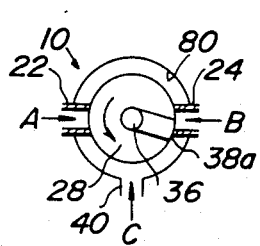
FIG_5l
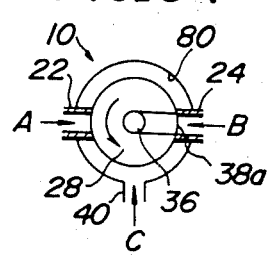

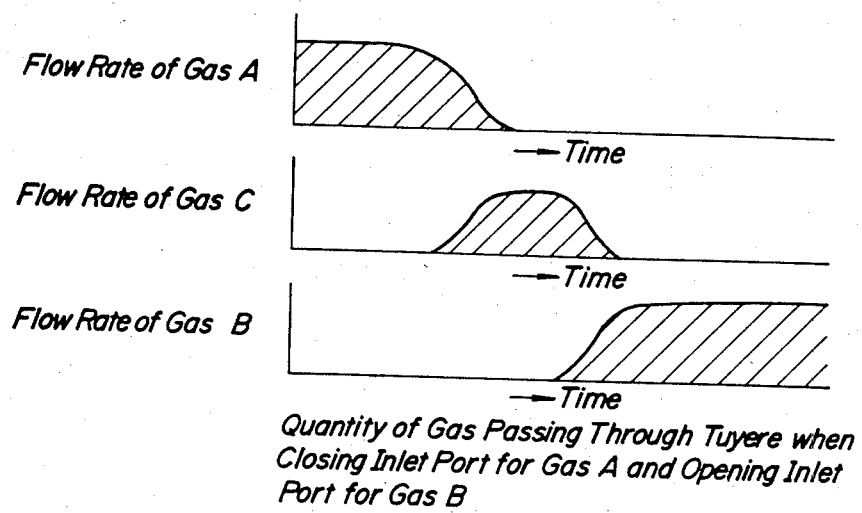
FIG_6
Quantity of Gas Passing Through Tuyere when Closing Inlet Port for Gas A and Opening Inlet Port for Gas B
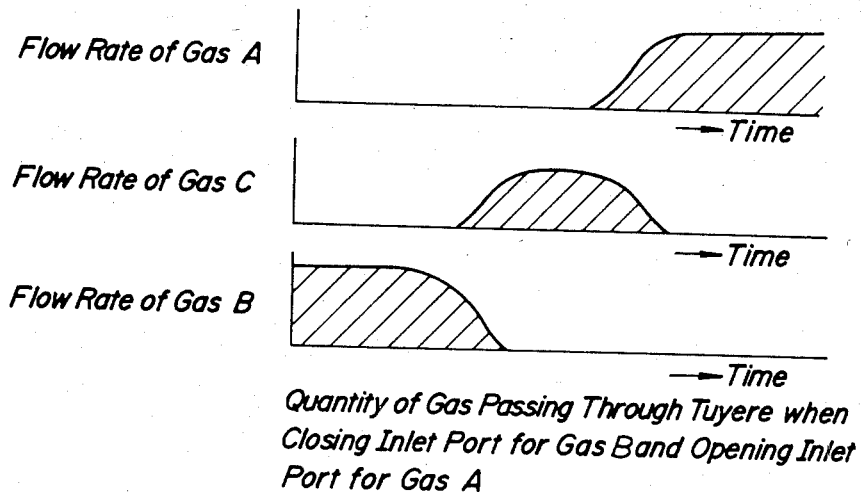
FIG_7
Quantity of Gas Passing Through Tuyere when Closing Inlet Port for Gas B and Opening Inlet Port for Gas A

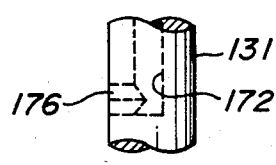
FIG_9
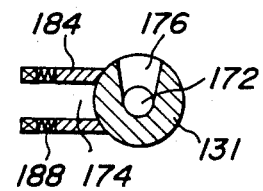
FIG_10
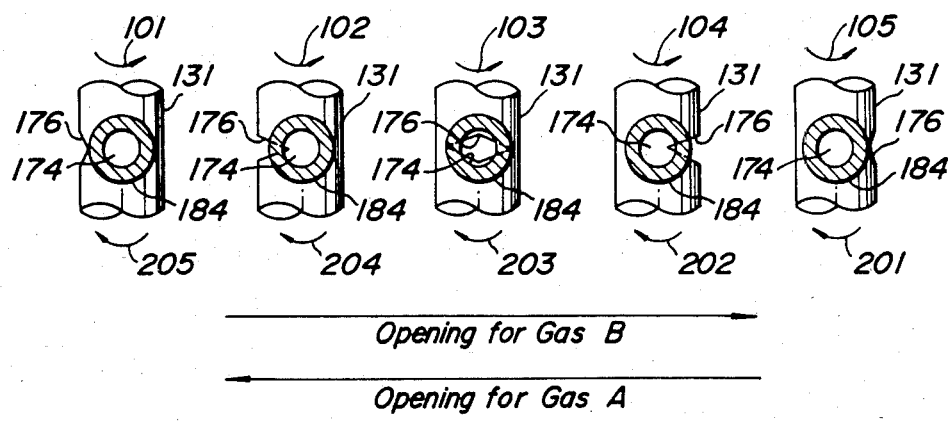
FIG_11a  FIG_11b  FIG_11c  FIG_11d  FIG_11e
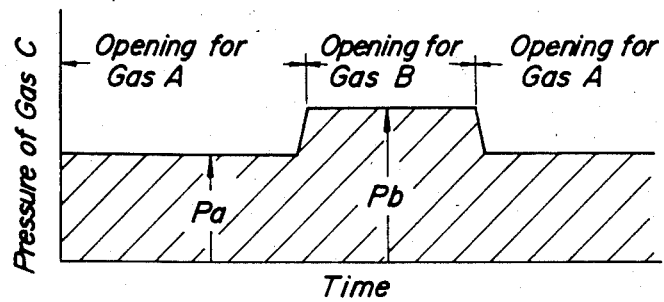
FIG_12

FLOW CHANGE-OVER VALVE FOR THE BLOWING OF FLUIDS INTO MOLTEN METAL VESSEL

BACKGROUND OF THE INVENTION (1) Field of the Invention:

This invention relates to a flow change-over valve for the blowing of fluids into a molten metal vessel, and more particularly to a flow change-over valve which is advantageously used as a gas selecting valve when one of plural kinds of fluids (for instance, gaseous fluids containing powders which are unfavorable to be mixed with each other) is selectively blown into a bottom-blown converter with the change of times in the refining stage.

(2) Description of the Prior Art:

As a method of steel making and refining molten iron with a large amount of scrap in the bottom-blown converter, there has been proposed a technique in which a mixture of, for example, powdery coal and methane gas is blown into the converter through a part of bottom tuyeres and oxygen gas is simultaneously blown through the other remaining tuyeres to fuse the scrap, and after the inlet passage of the flow change-over valve is changed into another inlet passage, the resulting melt is refined by blowing oxygen gas containing powdery quicklime, etc. from such another inlet through the tuyeres used for the blowing of coal-containing methane gas as disclosed, for instance, in W. German Patent Application Publication No. 28 38 983 or Japanese Patent laid open No. 57-29,521.

In this refining method, the kind of the fluids to be blown into the converter should be changed with the change of times in the refining stage, which requires the use of a flow change-over valve. As the flow change-over valve satisfying this requirement, there is proposed a flow change-over valve of the following structure in Japanese Patent laid open No. 56-33,415. This is, it relates to an apparatus for introducing both finely powdered carbon-containing fuel floating in a carrier gas and oxygen into a molten iron vessel, characterized in that a movable valve member is arranged in a housing comprising a fuel supply pipe, an oxygen supply pipe and a tuyere pipe, and the valve member opens into a fuel hole section or an oxygen hole section and is actuated by the oxygen pressure inside the supply pipes.

In FIG. 1 is shown a vertical section view of the above apparatus (flow change-over valve), wherein numeral 2 is a movable valve member, numeral 4 a sealing portion, numeral 6 a fixed valve member, and numeral 8 bellows. In this type of the flow change-over valve, however, when the movable valve member 2 is moved toward the sealing portion 4 for closing, there are fears that the powder enters therein and that the hermetric property is deteriorated in a long-term use to disable the reliable change-over between two gases. Further, when the inlet passage is changed into another one in the flow change-over valve, if it is intended to use two gases to be prevented from mixing with each other, for instance, methane gas containing powdery coal and oxygen gas, there is a possibility that the above two gases are mixed with each other in the interior of the flow change-over valve. In the latter case, there is a risk that the coal in the gas is burned by the mixing of both gases to overheat the flow change-over valve. Moreover, there is also a danger that the overheating causes the deformation and burning of the sealing portion, resulting in the deterioration of the sealing. In addition, the bellows are worn out with the blown powder to be bored, so that an explosion is caused through the mixing of the two gases.

SUMMARY OF THE INVENTION

It is, therefore, an object of the invention to eliminate the above drawbacks of the prior art and to provide a flow change-over valve which can surely prevent the mixing of two fluids and hold a gas pressure in an outlet passage at a given value during the changing-over of inlet passages for selecting an appropriate gas kind.

It is another object of the invention to provide a flow change-over valve having such a structure that the biting of powder entrained in the gas is prevented between the valve body and the housing and a satisfactory hermetical property is held over a long period of time with an excellent durability.

According to the invention, there is the provision of a flow change-over valve for the blowing of fluids into a molten metal vessel comprising a housing provided with at least three inlet ports for different fluids and an outlet port, a valve body provided therein with a main passage selectively communicating between a respective one of the inlet ports and the outlet port and rotatably supported in the housing to perform the changing-over of inlet passages, wherein an inlet port for purging fluid among the inlet ports is opened in the housing, and a shroud-like gap surrounding the valve body is formed between the inner periphery of the housing and the outer periphery of the valve body in such a manner that it communicates with the inlet port for the purging fluid disposed in the housing and is always to be communicated with an opening of an inlet port in the main passage during the changing-over through the rotation of the valve body.

According to a modified embodiment of the invention, an inlet passage for the purging fluid is arranged in a lower extension portion of the valve body so as to communicate with the main passage of the valve body.

BRIEF DESCRIPTION OF THE DRAWINGS

The invention will be described in greater detail with reference to the accompanying drawings, wherein:

FIGS. 5a–5l are views schematically illustrating a sequence in the change of gas supply from gas A to gas B through purging gas C;

FIGS. 6 and 7 are graphs showing changes of flow rate in the gases A, B and C with the lapse of time, respectively;

FIG. 9 is a perspective view of a part of a valve body as taken along a line IX—IX of FIG. 8;

FIG. 10 is a sectional view of the valve body as taken along a line X—X of FIG. 8;

FIGS. 11a–11e are views schematically illustrating changes of communication area between openings 174 and 176; and FIG. 12 is a graph showing a change of control pressure with the lapse of time during the rotation of the valve body.

DETAILED DESCRIPTION OF THE INVENTION

The invention will be described in detail with respect to an example of selectively blowing two fluids (powdery coal-containing methane gas→oxygen gas) into a bottom-blown converter from the bottom thereof with the change of times in the refining stage.

The selective supply of the above two fluids to the converter is performed by the changing of inlet passages using a three-way flow change-over valve provided with three inlet ports, an outlet port and a single passage. In the changing of the inlet passage, it is necessary to prevent these two fluids from being mixed with each other as mentioned above.

For this purpose, the flow change-over valve according to the invention is so constructed that when the inlet passage is changed into another one, a purging fluid is introduced into the main passage of the valve body to replace the fluid passing through the main passage of the valve body with the purging fluid.

Figure 1:
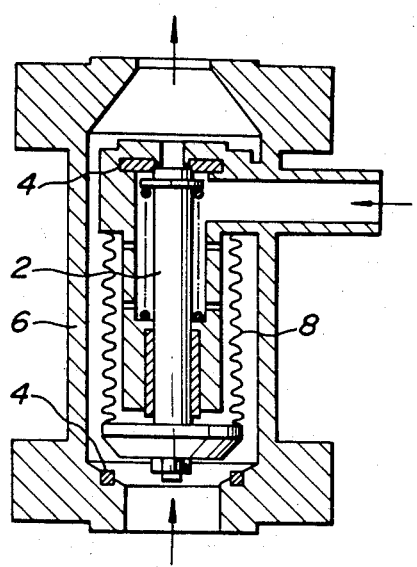
FIG. 1 is a sectional view of the conventional flow change-over valve as previously mentioned.
Figure 2:
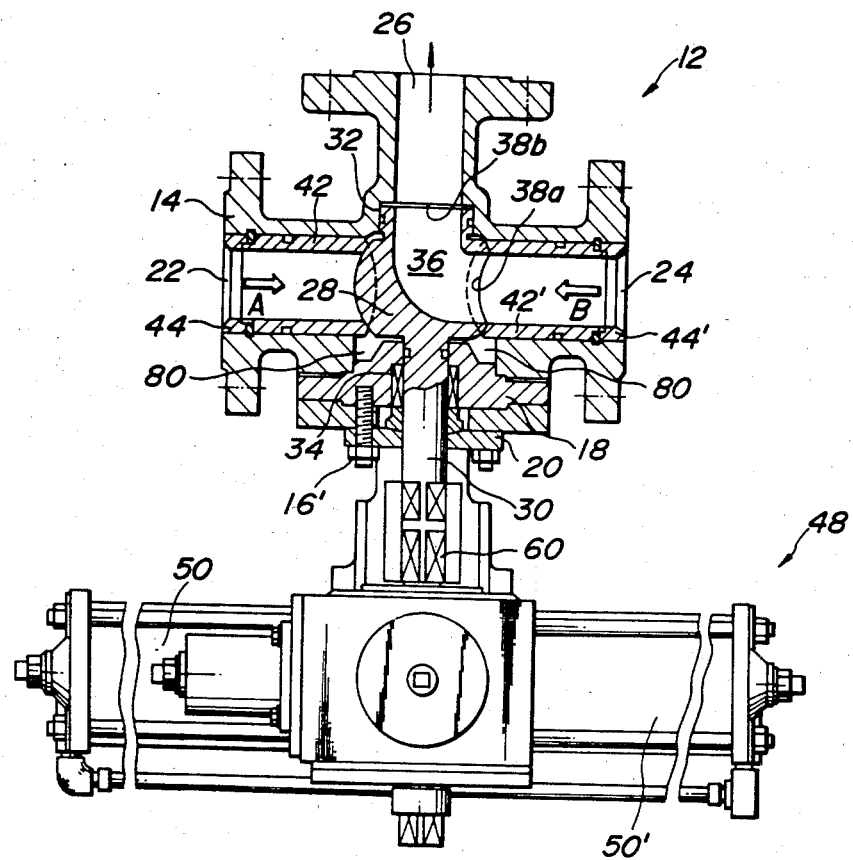
FIG. 2 is a sectional view of an embodiment of the flow change-over valve according to the invention.
Figure 3:
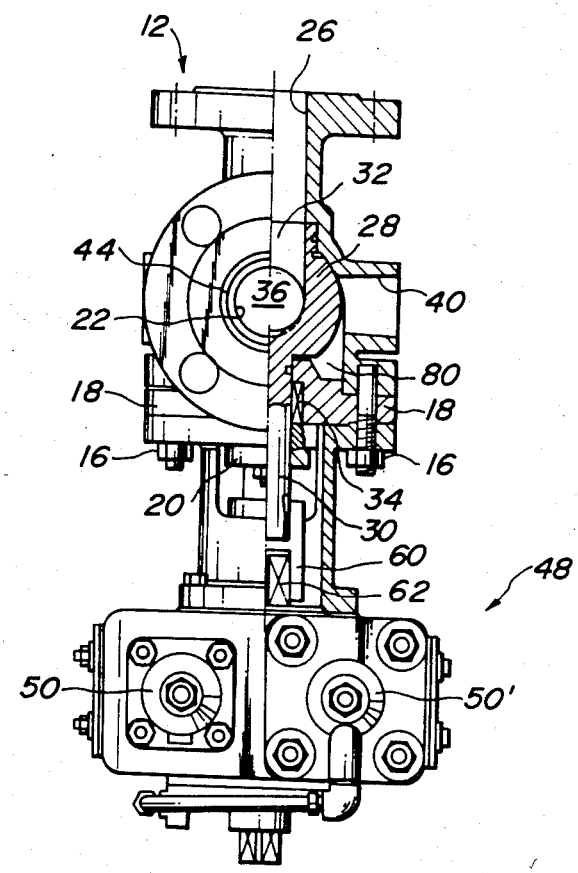
FIG. 3 is a left side view partly shown in section of the embodiment in FIG. 2.

In FIGS. 2 and 3, numeral 12 is a housing with a space for supporting a valve body, which comprises a main housing body 14 and a housing cap 18 fitted thereto by means of bolts and nuts 16. Numeral 20 is a packing gland connected to the housing cap 18 by means of bolts and nuts 16'. In the main housing body 14 are formed a first inlet port 22 and a second inlet port 24 for communicating the valve body-supporting space with the exterior, which ports are also connected to supply pipes for different gases A and B, respectively. Further, an outlet port 26 directing to the converter is formed in the housing 12 at a place perpendicular to the inlet ports 22 and 24. A spherical valve body 28 is hermetically fitted into the valve body-supporting space formed in the housing 12, and has upper and lower extension portions 30 and 32 in the axial direction of the outlet port 26, and is rotatably supported around the axis of the outlet port 26 through a gland packing 34 arranged between the extension portion 30 and the housing cap 18. In the valve body 28 is formed an elbow-like main passage 36 for communicating either of the inlet ports with the outlet port. Referring to the illustrated embodiment, the elbow-like main passage 36 is so designed that one opening 38a thereof is communicated with the inlet port 24, while the other opening 38b is communicated with the outlet port 26. The outlet port 26 is communicated with a bottom tuyere (not shown) of the converter. Inside the first and second inlet ports 22 and 24 are fitted cylindrical seat rings 42, 42' through seat holds 44, 44' for the purpose of hermetically sealing that portion of each inlet port which contacts with the valve body 28. These seat rings are arranged under such a state that they are pushed against the outer periphery of the valve body, whereby the leakage of the gases A and B into a shroud-like gap 80 as mentioned later can be prevented.

Furthermore, an inlet port 40 for a purging gas is opened in the housing 12 at a position orthogonal to the inlet ports 22 and 24 in the same plane. This inlet port 40 is always communicated with the outlet port 26 during the rotation of the valve body 28 for moving the opening 38a of the main passage 36 in the valve body 28 from the first inlet port 22 to the second inlet port 24 and vice versa, that is, during the changing-over between the inlet passages, whereby the two gases A and B are prevented from being mixed with each other.

For this purpose, according to the invention, a shroud-like gap 80 is formed between the inner periphery of the housing 12 and the outer periphery of the valve body 28 so as to surround, for example, about a half of the outer periphery of the valve body 28. Thus, a purging gas introduced from the inlet port 40 once enters into the shroud-like gap 80 and then passes from the opening 38a of the main passage through the opening 38b thereof into the outlet port 26 directing to the converter.

Figure 4:
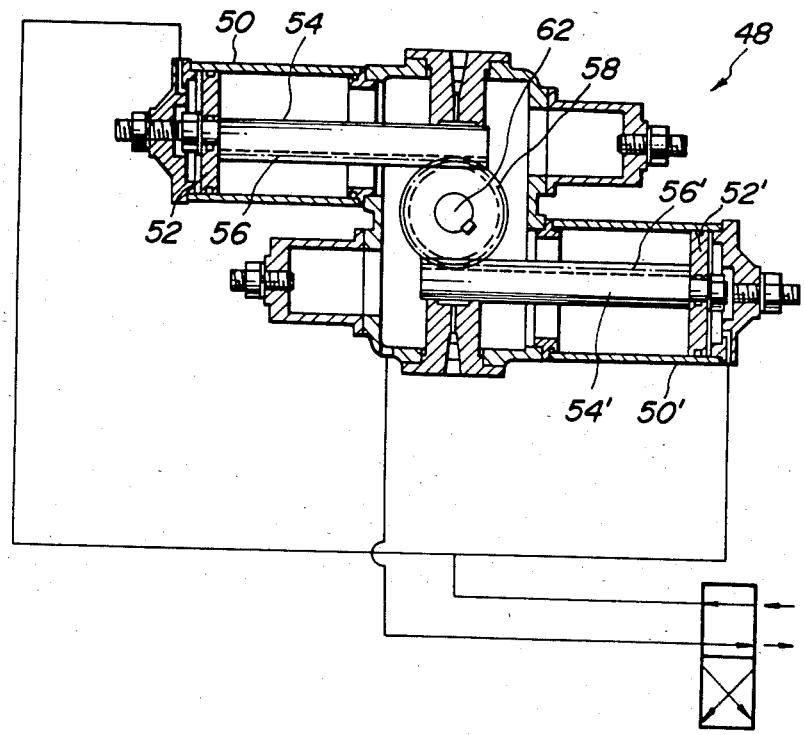
FIG. 4 is a sectional view of a driving means for a valve body.

In order to change over the inlet passage, the valve body 28 is rotated by a driving means 48 as shown in FIG. 4. The driving means 48 comprises a pair of parallel cylinders 50, 50' partially communicating with each other, pistons 52 and 52' disposed in the cylinders 50, 50', rods 54, 54' connected to the respective pistons 52 and 52' and having racks 56 and 56' on the opposite faces thereof, and a pinion 58 engaging with both the racks 56, 56'.

A coupling 60 is connected at its one end to the lower extension portion 30 of the valve body 28 and at the other end to a pinion shaft 62 cooperating with the pinion 58. When the pinion 58 is rotated by moving the racked rods 54 and 54' with the reciprocal movement of the pistons 52 and 52', the valve body 28 is driven through the coupling 60 and the extension portion 30.

In FIGS. 5a–5l is illustrated the relation of the inlet ports 22, 24 and 40 to the main passage 36 when the valve body 28 is rotated for the changing-over of the inlet passage. The illustrated embodiment is a sequence of changing the kind of gases to be flown into the converter from gas A to gas B. When actuating the driving means 48 for the valve body 28, the complete communication state between the first inlet port 22 and the opening 38a of the main passage 36 as shown in FIG. 5a becomes gradually incomplete, and the supply of the gas A into the converter is completely stopped at such a state as shown in FIG. 5d. In this state, since a purging gas C is filled in the shroud-like gap 80 surrounding the valve body 28 through the inlet port 40, the gas A passing through the main passage 36 is completely purged with the purging gas C. Only the flowing of the gas C is continued until a state of FIG. 5i. When the valve body 28 is rotated to a state of FIG. 5j, a part of the purging gas C is replaced with the gas B, and the amount of gas B gradually increases with the rotation of the valve body. Lastly, the gas C passing through the main passage 36 is completely replaced with the gas B in a state of FIG. 5l. If it is intended to change the gas B into the gas A, the pistons 52 and 52' are reversely moved to make the operation from FIG. 5l to FIG. 5a.

The above changing-over is featured by the action of the shroud-like gap 80 formed so as to surround the valve body 28. That is, the gap 80 is always filled with the purging gas (Ar, $N_2$, or the like) at a pressure enough to overcome the static pressure of molten steel in the converter, preferably at a pressure equal to that of the gases A and B, so that the changing-over of inlet passage can be performed in such a state that both the gases A and B are completely prevented from being mixed with each other under the controlled pressure.

FIGS. 6 and 7 show changes of flow rate in the gases A, B and the purging fluid C (in this example, gas) with the lapse of time in the aforementioned changing-over of inlet passage. As apparent from FIG. 6, when the valve body is rotated as shown by arrows in FIGS.

5a–5l, the gas C is supplied to the main passage 36 on the way where the gas A is changed to the gas B. Then, the gas B is flown into the main passage 36 after the gas inside the main passage 36 is completely replaced with the gas C. Thus, the mixing between the gases A and B is completely prevented. As shown in FIG. 7, when the valve body is rotated in the opposite direction, the gas C is supplied into the main passage 36 to purge the gas B inside the main passage 36, on the way where the gas B is changed to the gas A, so that the mixing between the gas B and the gas A is also prevented.

Figure 8:
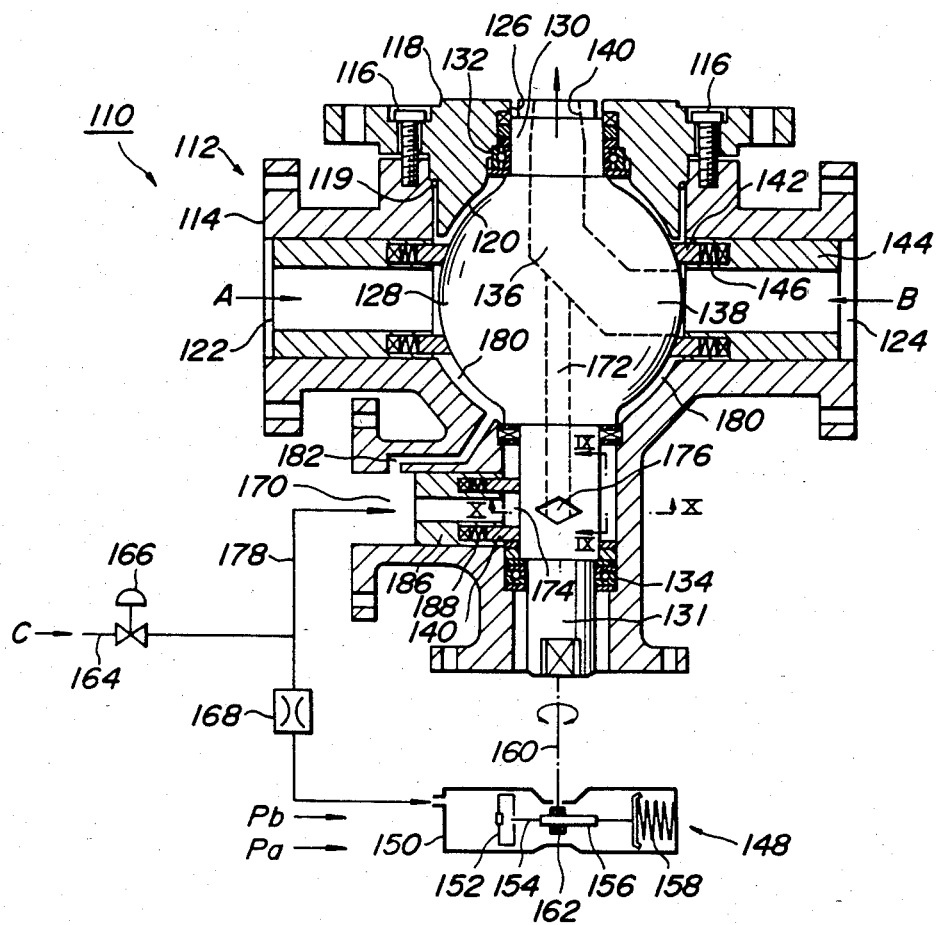
FIG. 8 is a sectional view of another embodiment of the flow change-over valve according to the invention.

FIG. 8 is a vertical sectional view of another embodiment of the flow change-over valve 110 according to the invention, which is disposed midway of a gas supply passage connected to a tuyere of a bottom-blown converter.

In FIG. 8, numeral 112 is a housing, which comprises a main housing body 114 and a housing cap 118 attached thereto by means of bolts 116. Numeral 119 is an O-ring for sealing. Numeral 120 is a valve body-fitting portion formed in the housing 112. In the main housing body 114 are formed a first inlet port 122 and a second inlet port 124 so as to communicate the fitting portion 120 to the exterior and to supply gases A and B therethrough, respectively. An opening 126 is formed in the housing cap 118.

Into the valve body-fitting portion 120 is installed a spherical type valve body 128 having upper and lower extension portions 130 and 131 in an axial direction thereof, which are supported within the housing 112 by means of bearings 132 and 134. In the valve body 128 is formed a main passage 136, one end of which being opened to the side periphery of the valve body 128 (numeral 138 being its opening) and the other being an opening 140 as an outlet port of the flow change-over valve. The outlet port 140 is communicated with a tuyere (not shown). A ring-like large diameter sealing member 142 is supported by a seal retainer 144 at an opening of each of the first and second inlet ports 122, 124 facing the valve body 128, while being urged to the valve body by means of a resilient member 146, whereby the gases A and B are prevented from flowing into a gap 180 as mentioned later.

The valve body 128 is rotatably driven by a driving means 148. This driving means 148 comprises a cylinder 150, a piston 152 disposed in the cylinder 150, a rod 154 connected to a piston 152, a rack 156 secured to the rod 154, and a spring 158 causing a restoring movement of the piston 152. On the other hand, a shaft 160 is connected to the lower extension portion 131 of the valve body 128, and a pinion 162 engaging with the rack 156 is attached to the tip of the shaft 160. A pressure Pa or Pb is applied to the cylinder 150 from a line 164 for the supply of a purging fluid through a pressure control valve 166 and a flow control valve 168 to move the piston 152. Moreover, the flow control valve 168 is arranged to diminish the fluctuation of the pressure inside the cylinder 150 during the changing-over of inlet passage (when the purging gas is flown) as mentioned later. When the pressure Pb higher than a force overcoming the spring force of the spring 158 is applied from the line 164 to the cylinder 150, the piston 152 is moved in the right direction in FIG. 8, during which the rack 156 is shifted to turn the pinion 162, whereby the valve body 128 is rotated in a forward direction. When the pressure applied from the line 164 to the cylinder 150 is a small pressure Pa, the piston 152 is returned to its original position (in the left direction in FIG. 8) by the resilient force stored in the spring 158, so that the pinion 162 and hence the valve body 128 are reversely rotated with the leftward movement of the rack 156.

In the main housing body 114 and the valve body 128 are bored supply passages 170 and 172 for the purging fluid, respectively, which communicate the main passage 136 to the outside of the flow change-over valve 110, wherein the opening 174 of the passage 170 on the side of the main housing body 114 and an opening 176 of the passage 172 on the side of the valve body 128 are so arranged that they are opposed to each other to communicate the passage 170 with the passage 172 during the changing-over of inlet passage against the main passage 136 of the valve body 128. In FIGS. 9 and 10 are enlargedly shown portions of the openings 174 and 176, wherein FIG. 9 is a perspective view as viewed from the arrow IX of FIG. 8 and FIG. 10 is a sectional view as taken along the line X—X of FIG. 8. The purging fluid is supplied into the purging fluid supply passage 170 formed in the main housing body 114 from the purging fluid supply line 164 through a pipe line 178. Further, a passage 182 for supplying a pressurized fluid is formed in the main housing body 114 to communicate the gap 180 between the valve body 128 and the housing 112 with the purging fluid supply passage 170, so that the purging fluid can be supplied into the gap 180 at the pressurized state.

Moreover, a ring-like small diameter sealing member 184 is supported by means of a retainer 186 and resilient member 188 as in the case of the first and second inlet ports 122 and 124, whereby the leakage of the purging fluid is prevented.

FIG. 8 illustrates such a state that the high pressure Pb is applied to the cylinder 150 so as to push the piston 152 up to the utmost pushed position. In this case, the main passage 136 communicates with the second inlet port 124, so that the gas B flows toward the tuyere through the main passage 136. When the pressure applied from the line 164 to the cylinder 150 is reduced from Pb to Pa, the piston 152 is moved toward the left direction by the resilient force of the spring 158, whereby the valve body 128 is rotated to communicate the main passage 136 with the first inlet port 122. In this changing-over of inlet passage, the main passage 136 is communicated with none of the first and the main passage 136 is communicated with none of the first and second inlet ports 122, 124 in the course of rotating the valve body 128. In this state, the purging fluid supply passages 170 and 172 are communicated with each other, whereby the purging fluid is supplied into the main passage 136 from the line 164. FIGS. 11a–11e illustrate the communication state between the opening 174 and the opening 176 as viewed from the side of the opening 174 toward the extension portion 131 of the valve body 128. FIG. 11a shows the state in which the first inlet port 122 is communicated with the main passage 136. FIG. 11e shows the state in which the second inlet port 124 is communicated with the main passage 136. As the valve body is rotated from the state shown in FIG. 11a to states as shown by arrows 101, 102 and 103, the communicating area between the openings 174 and 175 gradually increases, and the purging fluid begins to flow. After passing through the maximum communication state of FIG. 11c, the valve body is further rotated to states as shown by arrows 104 and 105 to terminate the flowing of the purging fluid. When the valve body is reversely rotated as shown by arrows 201, 202, ..., 205, the purging fluid is supplied into the main passage 136 through the passages 170 and 172 as similarly but reversely in the previous operation. The change of flow rate in the gases A and B and the purging fluid C (gas in this case) with the lapse of time during changing-over of inlet passage is substantially the same as in FIGS. 6 and 7.

As mentioned above, when the piston 152 is returned to its original position (moved in the left direction of FIG. 8), the pressure Pa lower than that at the forward movement is applied to the cylinder 150 (FIG. 12 is a graph showing the change of the pressure in gas C with the lapse of time). This pressure Pa is so set that the pressure of the purging fluid to be introduced into the main passage 136 becomes enough to overcome the static pressure of molten metal imposed upon the tuyere. It is preferable that the spring constant of the spring 158 is set at such a degree that the difference between the pressures Pb and Pa is not extremely large in the reciprocal movement of the piston.

Although the valve body 28 or 128 is rotated by the driving means 48 or 148 of cylinder type in the above illustrated embodiment, it may be driven by a separate motor. Further, although the above explanation relates to the use of the flow change-over valve 10 or 110 in the tuyere of the bottom-blown converter, the invention may be applied to other molten metal vessel such as an outside furnace refining vessel and the like in which the mixing of two fluids, for instance, two gases must be avoided.

As mentioned above, according to the invention, when changing-over the inlet passage of the flow change-over valve, the purging fluid is introduced into the main passage of the valve body to replace the fluid present in the main passage with the purging fluid, so that the mixing of two gases are assurely prevented. Moreover, the gas exchange can stably be made without causing of fear of reducing the gas pressure applied to the tuyere during the changing-over of inlet passage.

What is claimed is:

1. A flow change-over valve for the blowing of fluids into a molten metal vessel comprising a housing provided with an inner body supporting space, an outlet port and at least three inlet ports for different fluids, said at least three inlet ports comprise first, second and third inlet ports, a spherical valve body hermetically fitted into said supporting space, said valve body having upper and lower extension portions disposed axially with respect to said outlet port, said valve body rotatably supported in the housing to perform a changing-over of said inlet passages and provided therein with a main passage communicating with said outlet port and selectively communicating between a respective one of said first, second or third inlet ports, said main passage extending through the upper extension portion of the valve body for communication with the outlet port, said main passage further defining an inlet opening in said valve body for communication with a respective one of said first, second or third inlet ports, and an outlet opening which defines the outlet port, said third inlet port being a purging fluid inlet arranged to communicate with said inlet opening so as to provide a purge fluid flow through said main passage to the outlet port during each rotation of the valve body when changing-over from said first inlet port to said second inlet port and vice versa, hermetic sealing means providing a sealed fluid passage, respectively, between each of said first and second inlet ports and the inlet opening of said valve body, and means for pushing said hermetic sealing means against the valve body so as to prevent leakage, said housing being provided with a shroud-like gap surrounding the valve body, said gap being in communication with the inner periphery of the housing, said gap being in communication with said third inlet port for purging fluid and the inlet opening of said main passage to provide a purge fluid flow when the valve body changes-over from said first inlet port to said second inlet port so as to provide a purge fluid flow through said main passage, and vice versa, to prevent any mixing of different fluids flowing through said first and second inlet ports, the lower extension portion of the valve body being provided with a purge fluid passage for communicating with a second purge fluid inlet, said purge fluid passage extending within said purge fluid passage extending within said lower extension portion to said spherical valve body, said passage communication with said main passage interiorly of said spherical valve body so as to direct purging fluid toward said outlet port, said housing including a purge fluid connection wherein both said purge fluid inlet and said second purge fluid inlet communicate with said purge fluid connection.

2. A flow change-over valve according to claim 1, further comprising a driving means connected to the lower extension portion of the valve body.

* * * * *